Figure 1:
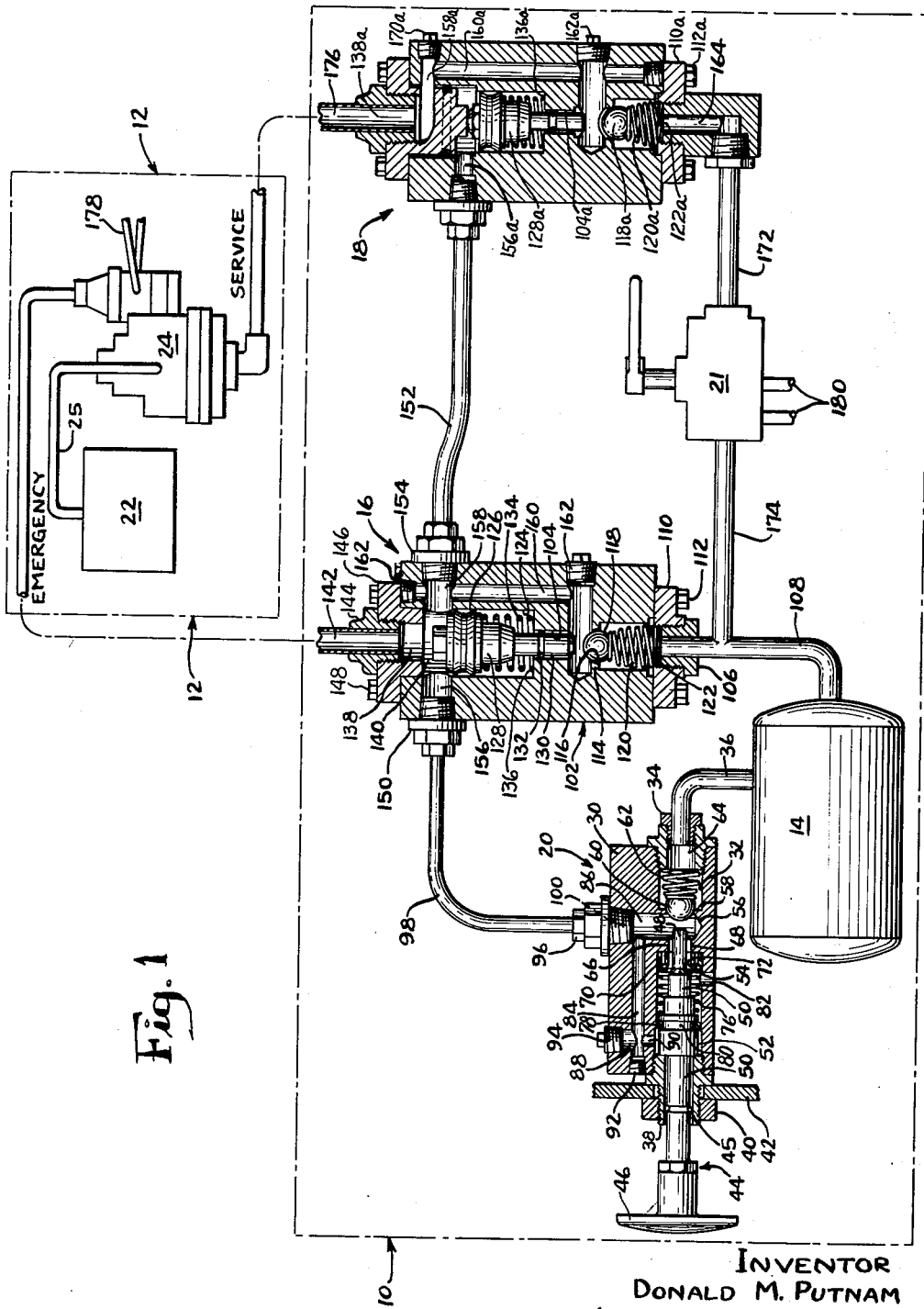

INVENTOR
DONALD M. PUTNAM
by: Fred Gerlach
ATTY.

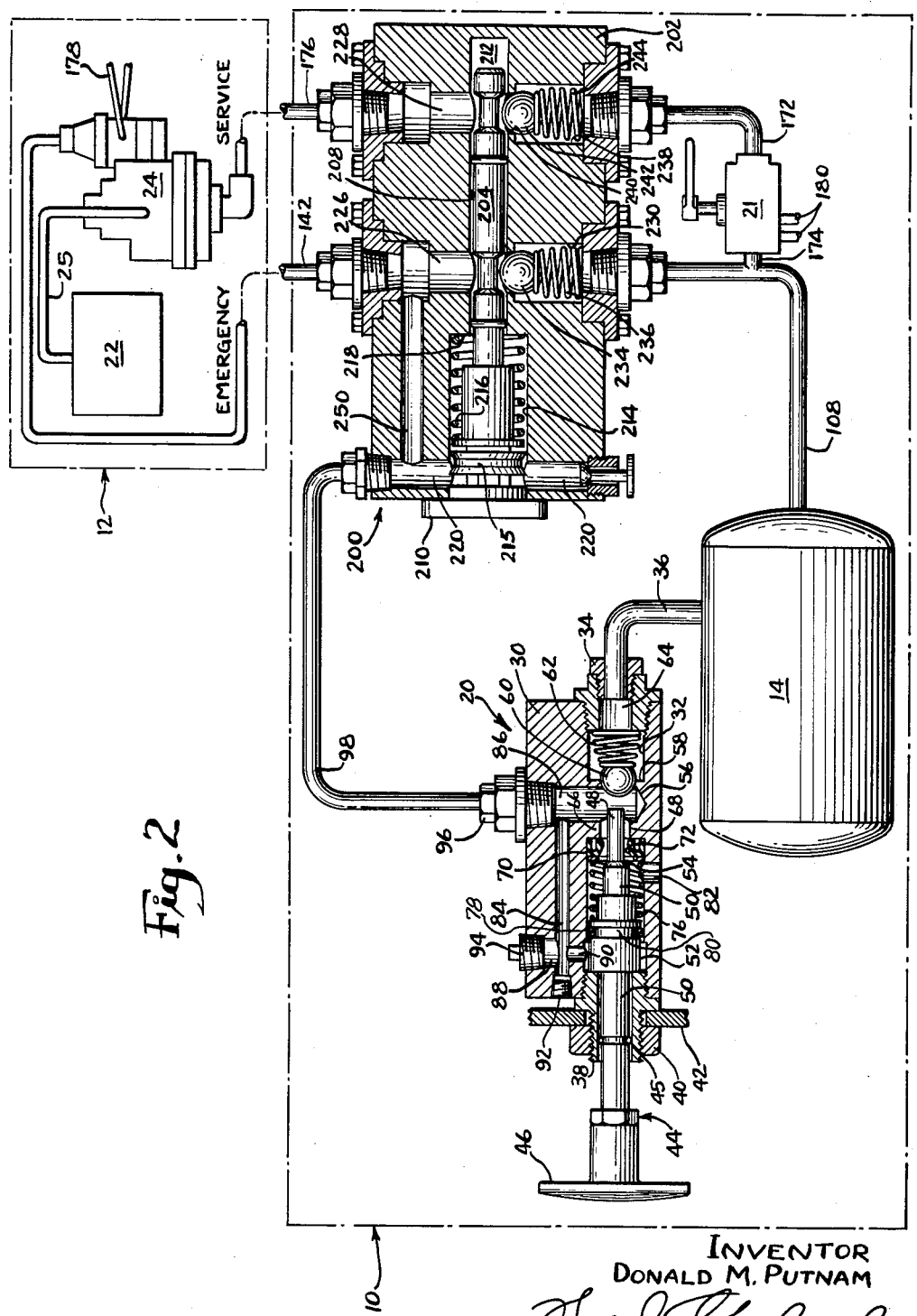

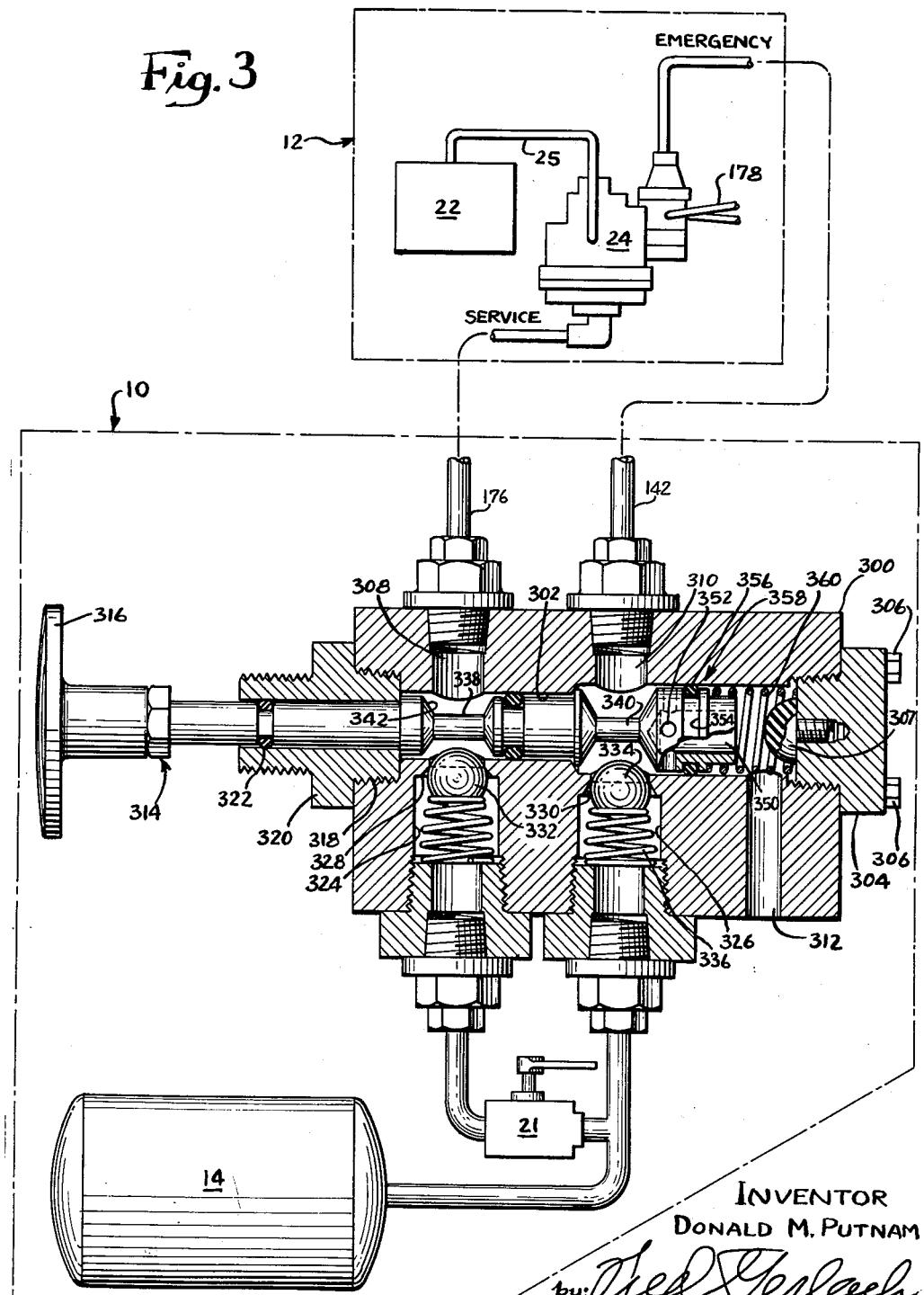

United States Patent Office 2,986,426
Patented May 30, 1961

2,986,426

PNEUMATIC BRAKING SYSTEM FOR TRACTOR-TRAILER COMBINATIONS

Donald M. Putnam, Chicago, Ill., assignor to Monarch Tool & Machinery Co., Chicago, Ill., a corporation of Illinois Filed May 2, 1957, Ser. No. 656,702

6 Claims. (Cl. 303—8)

The present invention relates to pneumatic braking systems for tractor-trailer combinations and more particularly to a novel braking system wherein the pneumatic braking instrumentalities on the tractor are operatively connected to the pneumatic braking instrumentalities on the trailer in such a manner that greater versatility of operation under various conditions, both normal and of an emergency nature, than has heretofore existed in connection with conventional systems, is made possible.

In compliance with the laws of practically every state, tractor drawn trailers are equipped with a braking system which operates automatically to engage the trailer brakes in the event of an emergency break away, application of the trailer brakes in such instances being effected under the control of a so-called emergency application or relay valve which, although it is capable of conserving the pressure built up in the trailer pressure tank, is obviously incapable of exerting any control over the tractor braking system. As a consequence the pressure existing in the tractor pressure tank is exhausted more or less rapidly with the result that the requisite pressure is not available for operation of the tractor brakes. This condition is only partially remedied by the provision of manual shut-off valves which are more often than not interposed in the tractor service and emergency lines, usually being mounted on the tractor pressure tank itself, in that in the event of an emergency break away it is necessary for the operator to leave the cab for the purpose of gaining access to the valves for shut-off purposes. The present invention is designed to overcome the above-noted limitations that are attendant upon the use of conventional tractor-trailer braking systems and, toward this end, it contemplates in one form thereof, the use of three separate but interconnected valve units or assemblies of novel design, all three units being capable of installation on the tractor with two of the units being interposed in the tractor service and emergency lines respectively and the third unit being installed in a convenient location in the tractor cab where it is readily accessible to the operator. The two units are operable under the control of the third unit, which may be manually operated, for initial trailer tank charging operations, the charging operation being automatically carried to completion upon an initial setting of the control unit. Thereafter the two units function to maintain the tractor brake system operatively connected to the trailer brake system for simultaneous operation of both the tractor and the trailer brakes by the operator. In emergencies involving an involuntary break away, a manual disconnecting of the trailer from the tractor, or the presence of a leak in the emergency line or certain other portions of the system, the reduction of pressure within portions of the system and occasioned by such break away or leak will effect automatic sealing off of the emergency and service lines so that the pressure within the tractor pressure tank will be retained for proper tractor brake application under the control of the operator while the usual emergency application or relay valve associated with the trailer will remain effective to apply the trailer brakes. Furthermore, for tractor-trailer parking purposes, the control valve may be manipulated to effect release of pressure in the emergency and service lines to prevent overloading thereof while the action of the emergency application or relay valve is relied upon to maintain the trailer brakes applied.

The provision of a tractor-trailer brake system of the character briefly outlined above being among the general objects of the invention, it is a more specific object to provide a system having valve assemblies associated therewith of the character and for the purpose briefly outlined above and in which the control valve is extremely simple in its construction, consisting as it does of a relatively small and compact valve body capable of being easily machined to produce the required bores and passages therein and having associated therewith a one-piece plunger the movements of which perform, in the system with which the valve assembly is associated, a relatively large number of functions which heretofore have required separate moving instrumentalities.

Another object of the invention, in a system of this character, is to provide a pair of valve assemblies designed for use in the service and emergency line of the system respectively, the two assemblies being substantially identical in their design and configuration, thus contributing toward economy of manufacture.

A still further object of the invention is to provide emergency and service valve assemblies for a braking system of the character set forth above which like the control valve are susceptible to ease of manufacture and which furthermore are possessed of air flow passages which are relatively straight and which, when the valves are positioned so that these passages extend vertically, are conducive toward effective drainage and consequent freedom from damage or inoperativeness due to freezing.

Yet another object of the invention is to provide a control valve assembly, together with valve assemblies controlled thereby, which, despite their relatively small size, are possessed of relatively large air passages and ports for full volume flow of air therethrough and consequent efficient operation of the system with which the valve assemblies are associated.

It is another object of the invention, in a modified form thereof, to provide a system of the character briefly outlined above and possessing the advantages set forth, in which still further simplicity of construction of the valve mechanism is attained by consolidation of the service and emergency valves in a single unit having a common valve block or housing for the two valve assemblies. A similar and related object of the invention, in another modified form thereof, is to provide such a system wherein all three valve assemblies, namely the control valve, the emergency valve and the service valve, are all incorporated in a single valve assembly involving a common valve block or casing. According to the present invention, such an arrangement is effected without sacrificing any of the advantages outlined above, while at the same time an additional advantage is obtained in that the entire assembly may be operatively mounted within the tractor cab where the danger of moisture solidification due to freezing is entirely obviated, at least during operation of the system.

The provision of a braking system for tractor-trailer combinations which is possessed of a minimum number of moving parts and which therefore is unlikely to get out of order; one which is rugged and durable and which therefore may be subjected to rough and prolonged usage; one which is capable of ease of assembly and disassembly for purposes of inspection, replacement of parts and repair; one which may be manufactured as original equipment or which may be easily applied to existing conventional systems, and one which otherwise is well adapted to perform the services required of it, are further desirable features which have been borne in mind in the production and development of the present invention.

In the accompanying three sheets of drawings forming a part of this specification several embodiments of the invention have been shown.

In these drawings:

Fig. 1 is a schematic view of a tractor-trailer air braking system constructed in accordance with the principles of the present invention and showing an emergency valve assembly, a service valve assembly and a control valve assembly, each in longitudinal section, operatively connected together in the system;

Fig. 2 is a schematic view similar to Fig. 1 showing a modified form of the system wherein the service valve mechanism and the emergency valve mechanism are consolidated in a single composite valve assembly; and Fig. 3 is a schematic view similar to Figs. 1 and 2 showing a further modified form of the system wherein the control valve mechanism, the service valve mechanism and the emergency valve mechanism are consolidated in a single composite valve assembly.

Referring now to the drawings in detail and in particular to Fig. 1 wherein a preferred embodiment of the tractor-trailer air braking system has been shown, the system is designed for application to a tractor-trailer combination the details of which have not been illustrated herein but wherein the tractor is represented by the dotted rectangle 10 enclosing the tractor-mounted structure associated with the system and wherein the trailer is represented by the dotted rectangle 12, likewise enclosing the trailer-mounted structure associated with the system. It will be understood, of course, that both the tractor 10 and trailer 12 are of conventional design and no claim is made herein to any novelty associated with the same.

Briefly, the tractor-mounted mechanism of the system includes the usual compressed air tank 14 which is hereinafter referred to as the tractor pressure tank and which on most tractors is mounted on the truck platform directly behind the tractor cab; an emergency valve assembly 16 which may be mounted upon and operatively connected to the pressure tank 14 in place of one of the two manual shut-off valves ordinarily provided on such tanks; a service valve assembly 18 which similarly may be mounted on the pressure tank 14 in place of the other shut-off valve; a control valve assembly 20 which may be suitably mounted on the tractor instrument panel, the dashboard or other suitable portion of the tractor framework where it is conveniently available for manual operation, or which may be mounted on the floor of the driver's compartment and adapted for pedal operation; and a master control valve assembly 21 which may be pedal operated or manually operated, the latter method of actuation being illustrated herein. Irrespective of the particular mounting for the various units 16, 18, 20 and 21 of the present brake control system, the essential features of the invention are at all times preserved.

The trailer-mounted mechanism of the present system forms no part of the present invention and consists of the conventional trailer pressure tank or reservoir 22 and a relay or emergency application valve 24 connected thereto by a line 25 and which, as required by the law of most states, supplies air to the trailer brakes from the pressure tank 22 to apply the brakes in the event of a break-away.

As will become readily apparent when the specific nature of the various units 16, 18 and 20 has been set forth, the control valve 20 may be manipulated initially to charge the trailer pressure tank 22 with air under pressure from the tractor pressure tank 14 and to actuate the service valve assembly 18 and condition the system in such a manner that the valve 21 may be operated to simultaneously actuate both the tractor and the trailer brakes. After the control valve 20 has been manually operated for initial charging of the trailer pressure tank 22, the system automatically becomes effective so that the tractor and trailer may become separated by an intentional disconnecting of the trailer, or by an unintentional or "emergency" break-away, with or without damage to or rupture of the connecting air lines or either one of them while the pressure existing within both the tractor pressure tank 14 and the trailer pressure tank 22 is conserved without appreciable loss of air so that in any event air under full tank pressure is available for operation of the tractor brakes and for automatic application of the trailer brakes under the influence of the aforementioned relay or emergency application valve 24. Additionally, in the event of a leak in the system at any point on the outlet side of the control valve 20, means are provided whereby, when the pressure within the system drops below a predetermined minimum, means are provided automatically conserving the remaining pressure of air within the tractor pressure tank, this pressure being sufficient for satisfactory operation of the tractor brakes, while the relay valve 24 is relied upon to apply the trailer brakes automatically.

Still referring to Fig. 1, the control valve assembly 20 is comprised of a valve casing 30 through which there extends longitudinally a bore 32, one end of which threadedly receives therein a composite two-part nipple fitting 34 by means of which this end of the bore may be operatively connected through a conduit or line 36 to the tractor pressure tank 14. The other end of the bore 32 threadedly receives therein a guide fitting 38 having associated therewith a clamping nut 40 by means of which the fitting, and consequently the entire valve assembly 20, may be fastened to the instrument panel 42 or other fixed portion of the tractor compartment in an accessible position. Slidably disposed within the bore 32 and projecting through the guide fitting 38 and sealed therein by a resilient O-ring 45 is a plunger 44 having an operating knob 46 at its outer end, a reduced stem 48 at its inner end and a connecting spindle portion 50 having centrally formed thereon an enlarged piston portion 52. The spindle portion 50 is formed at its forward or inner end with a tapered or frusto-conical valve surface 54 the function of which will be made clear presently.

The bore 32 is formed with a web portion 56 having centrally formed therein a valve seat or port 58, the web and seat existing in the forward regions of the bore and the seat 58 being designed for cooperation with a valve element 60 in the form of a ball which is spring pressed as at 62 against the seat 58, thus normally closing the inlet port 64 leading to the bore 32 from the pressure line 36. The plunger 44 is movable from the retracted position wherein it is illustrated in Fig. 1 and wherein the ball 60 remains seated, to the advanced position wherein the forward end of the plunger stem 48 engages the ball 60 and forces the same from its seat 58 to thus open the inlet port 64 and admit air under pressure to the bore 32.

The bore 32 is formed with a second web portion 66 having a central opening 68 therein through which the stem portion 48 of the plunger 44 extends. Disposed within the bore 32 immediately behind the web portion 66 is a sealing ring or cup 70 having a frusto-conical valve seat 72 formed thereon designed for cooperation with the frusto-conical valve surface 54 so that when the plunger 44 is in its advanced position, the port 74 afforded by the web opening 68 is closed. A coil spring 76 surrounds the spindle portion 50 of the plunger 44 and bears at one end against the sealing ring 70 and at its other end against the piston portion 52, thus normally urging the piston portion and consequently the plunger 44 as a whole toward its normal retracted position within the bore 32. The piston portion 52 is movable within the portion of the bore 32 rearwardly of the web 66 and a sealing ring 78 disposed within an annular groove 80 formed in the piston prevents passage of air in either direction past the piston during movement of the latter. The piston sealing ring 78 and the valve seat-forming ring 70 may each be formed of a suitable elastomeric material such as rubber, either natural or synthetic, or a rubber substitute having a relatively high degree of resiliency and effective sealing qualities. The central opening 68, normally communicates through the bore 32 with an exhaust port 82 formed in the casing wall, the port 82, in turn, communicating with the atmosphere.

The valve casing 30 is formed with a longitudinally extending passage 84 which extends inwardly from the front end of the casing and communicates with a transverse passage 86 extending inwardly from one side of the casing, the latter passage 86, in turn, communicating with the bore 32. An additional transverse passage or bore 88 extends inwardly from the side of the casing 30 and communicates with the bore 32 through a port 90. The outer ends of the passages 84 and 88 are adapted to be closed by threaded plugs 92 and 94 respectively. The passage 86 is operatively connected by means of a two-part nipple fitting 96 to one end of a conduit or line 98 leading to the emergency valve assembly 16, the fitting 96 providing a two way port 100 for the discharge of air during trailer tank charging and certain other operations and the entry of air during certain exhaust or bleed operations, all in a manner and for a purpose that will be set forth in detail subsequently.

The emergency valve assembly 16 involves in its general organization a valve casing 102 having a longitudinally extending bore 104 formed therein, one end of the bore being operatively connected by means of a nipple fitting 106 to a conduit or line 108 which communicates with the tractor pressure tank 14. The fitting 106 is threadedly received in an end plate 110 secured by cap screws 112 to an end of the casing 102. The bore 104 is formed with an internal web 114 providing a central valve seat 116 designed for cooperation with a valve element 118 in the form of a ball which is spring pressed as at 120 against the seat to normally close the inlet port 122 leading to the bore 104. The bore 104 is formed with an enlarged counterbore 124 in which there is reciprocable a piston 126 which may be formed of a suitable elastomeric material such as rubber or a rubber substitute and which is mounted on a plunger 128 having a reduced stem portion 130 slidable in the bore 104 and sealed therein by means of a suitable resilient O-ring 132. A coil spring 134 surrounds the plunger 128 and bears at one end against the end wall or shoulder 136 of the counterbore 124 and at its other end against the piston 126, thus urging the latter to a retracted position wherein the reduced stem portion 130 of the plunger 128 is out of contact with the valve element or ball 118. The piston 126 and plunger 128 are movable bodily as a unit from the retracted position thereof shown in Fig. 1 to an advanced position wherein the end of the stem 130 engages the ball 118 and unseats the same, thus opening the port 122 and allowing air to enter the bore 104.

At the end of the casing 102 remote from the inlet port 122 is an outlet port 138 in communication with a transverse bore 140 and operatively connected to the trailer relay valve 24 (and consequently the trailer pressure tank 22) through a trailer emergency line 142, the line being provided with a fitting 144 which is threadedly received in an end plate or cap 146 secured to the end of the casting 102 by cap screws 148. The port 138 is in communication with the bores 140 but is sealed from the remote portions of this latter bore 130 by the reciprocable piston 126. One end of the transverse bore 140 is connected to the line 98 by a two-part nipple fitting 150 and the other end thereof is connected to a line 152 leading to the trailer service valve 18 by means of a similar composite fitting 154. The two fittings 150 and 154 establishing a pair of ports 156 and 158 communicate with the opposite ends of the bore 140. The transverse bore 140 communicates with the bore 104 through a piston by-pass passage 160 of L-shape configuration, the ends of the straight portions of the passage being closed by plugs 162 employed for manufacturing purposes. The port 122 is thus capable of communication with the by-pass passage through the valve seat 116 when the ball valve 118 is dislodged therefrom by the action of the plunger stem 130, this action taking place when the pressure of air within the bore 140 exceeds the compressional effects of the spring 134.

The service valve assembly 18 is similar in its construction and design to the emergency valve assembly 16, the casings for the two assemblies being substantially identical. Therefore, to avoid needless repetition of description, like characters of reference but having the suffix "a" have been applied to like parts in the illustration of the two structures so that the previously rendered description of the assembly 16 will suffice for the assembly 18. The inlet ports 122 and 156 of the valve assembly 16 have their counterparts in the valve assembly 18 designated at 122a and 156a respectively. Similarly the counterpart for the outlet port 158 of the assembly 16 is represented by an outlet port 158a. This opening 158a in the valve assembly 18 is closed by a plug 170a. The port 122a communicates with a conduit or line 172 extending to the outlet side of the master control valve assembly 21 which is manually controlled for brake application. The inlet side of the valve assembly 21 is connected through a conduit or line 174 to the conduit 108. The port 158a communicates with a trailer service line 176 leading to the relay valve 24. From the valve 24, the usual lines 178 extend to the trailer brakes. From the valve 21, the usual lines 180 extend to the tractor brakes.

In the operation of the above-described system, during hook up operations when the tractor 10 is initially applied to the trailer 12, the operator will depress the plunger 44 associated with the control valve assembly 20, thus unseating the ball valve 60 and allowing air under pressure to flow from the tractor pressure tank 14 through line 36, ports 64, 58, passages 86, 84 and port 90 to the space existing behind the piston 52, thus maintaining a pressure upon the piston and "locking" the same against the action of the spring 76 which may be constructed to yield at a pressure of approximately 30 pounds per square inch, so to speak, in its depressed or advanced position. Air will also flow from the passage 86, through line 98, port 156, bore 140, outlet port 138 and line 142 to the relay valve 24 and from thence through the line 25 to charge the trailer pressure tank 22. The rate of charging of the tank 22 will be relatively slow until such time as sufficient pressure is built up in the tank and the lines leading thereto to overcome the action of the spring 134 associated with the piston 126 of the valve assembly 16, whereupon the piston 126 will be depressed, thus causing the plunger stem 130 to unseat the ball valve 118 and establish communication between the port 122 and the passage 160. At this time air will flow from the tractor pressure tank 14 through line 108, port 122, passage 160, bore 140, port 138 and line 142 to the valve 24 and tank 22 to complete the charging of the latter at a materially increased rate of charging. The spring 134 may be constructed so that it will yield at a pressure of 45 pounds per square inch and so that after this pressure has been exceeded, a rapid charging of the tank 22 will be effected.

The spring 120 associated with the service valve assembly 18 may likewise be constructed to yield at a pressure of approximately 45 pounds per square inch so that when this pressure is exceeded in the bore 140, it will be transmitted through the line 152, and port 166 to the bore 140 of the valve 18 and applied to the piston 126 of this latter valve to depress the same and unseat the ball valve 118 and establish communication between the port 164 and passage 160 leading to the port 168 and trailer service line 176. Thus, after the trailer tank 22 has been fully charged in the manner previously described, full line pressure is available from the tractor pressure tank 14 through lines 108, 174, valve 21, line 172, port 164, passage 160a, port 158a and service line 176 for actuation of the trailer brakes. It will be understood, of course, that operation of the valve 21 will simultaneously cause actuation of the tractor brakes through the lines 180.

When it is found necessary to disconnect the tractor 10 from the trailer 12 manually, the operator will move the plunger 44 of the control valve assembly 20 to its retracted position, this operation allowing the ball valve 60 to become seated to seal off the application of pressure to the bore 86. At the same time, the port 90 will become closed while the bore 86 will communicate with the exhaust port 82 through the port 68. Pressure thus will be relieved in the bores 140 of the two valve assemblies 16 and 18 by the flow of air through the lines 152 and 98 respectively, back through the port 100, transverse passage 86 and ports 68 and 82 to the atmosphere. As soon as the pressure in the system is reduced to approximately 45 pounds, the springs 134 of the valves 16 and 18 will cause their respective pistons 126 and plungers 128 to be retracted, thus seating the ball valves 118. Seating of the ball valve associated with the valve assembly 16 will seal off the emergency line 142 which may then be disconnected, while seating of the ball valve associated with the valve assembly 18 will seal off the service line 176 which likewise may be disconnected. In accordance with standard practice, disconnecting of the lines 142 and 176 will cause the automatic relay valve 24 to conduct air from the trailer pressure tank 22 to the trailer brakes through the lines 178.

In the event of an emergency break away, with or without rupture of either or both of the lines 142 and 176, the escape of air from these lines will lower the pressure in the bores 140 of the valves 16 and 18 so that the springs 134 will move their respective pistons 126 and plungers 128 to their retracted positions, thus causing the ball valves 118 to become seated and close off the lines 142 and 176 as heretofore described in connection with the manual disconnecting of the trailer from the tractor. At the same time, the pressure in the bore 86 and passage 84 of the control valve 20 will be relieved and this loss of pressure will be reflected through the port 90 so that the spring 76 will retract the plunger 44 and allow the spring 62 to move the ball valve 60 to its seated position on the valve seat 58 to thus seal off the line 36 leading to the tractor pressure tank 14. As in the case of a voluntary separation of the tractor and trailer, the relay valve 24 will serve in the usual manner to apply the trailer brakes.

When the emergency line 142 develops a slow leak, or if a leak develops in any part of the system which is in communication with the port 90 of the control valve 20, or if for any reason the pressure within the tractor pressure tank 14 falls below a predetermined minimum, which may be 30 pounds per square inch, the spring 76 will move the plunger 44 to its retracted position, thus seating the ball valve 60 and sealing off the line 36 leading to the tank 14 so that the pressure remaining in the tank 14 will be retained and available for operation of the tractor brakes when the valve 21 is manipulated. At the same time, the frusto-conical valve surface 54 is moved from its seat 72 so that the pressure existing in the system may be more rapidly bled to atmosphere through the port 82 as previously described. Again, the relay valve 24 will be effective to apply the trailer brakes.

With conventional air brake systems, when in an emergency it is necessary to park the tractor-trailer combination, for example on a steep hill, it is necessary to apply pressure to the emergency and service lines and these lines are subject to possible overloading and consequent rupture. By the present system, such emergency parking may be effected by pulling the plunger 44 to its retracted position, whereupon the ball valve 60 will become seated as previously described, and the ports 68 will become opened so that communication between the bore 86 and exhaust port 82 will be established to bleed the system and allow the emergency relay valve 24 to apply the trailer brakes which, ordinarily, will have sufficient braking effect to hold the vehicles and obviate any overloading of the system.

From the above description it will be seen that when the pressure developed in the system is above a predetermined minimum of approximately 40 pounds per square inch, the relatively large valve port 64 associated with the control valve 20, and the relatively large ports associated with the valve elements 118 of the emergency valve assembly 16 and of the service valve assembly 18 remain fully open for full flow of air through the system without appreciable restriction. Furthermore, above this minimum predetermined pressure, the only moving parts in the system are the parts associated with the master control valve 21 which applies air pressure to the tractor and trailer brakes when required. It is contemplated that the valves 16 and 18 shall assume a position in the installed system wherein their axes extend vertically or substantially so in order that there will be a natural drainage of moisture at all times with no danger of moisture collection and consequent freezing during cold weather.

In the form of the invention shown in Fig. 2, the same principle of operation of the system prevails as that described in connection with the form of the invention shown in Fig. 1. However, in the latter form, the emergency and service valve assemblies have been consolidated in a single valve assembly 200 having a unitary valve casing 202 and a single operating plunger 204, the movements of which are controlled by a control valve 206 which may be identical with the control valve 20 in the previously described form of the invention. Since the control valves 20 and 206 are identical in design and construction, identical reference numerals have been employed in Fig. 2 to designate the counterparts of the valve 20 shown in Fig. 1 and thus avoid needless repetition of description. Likewise, since the various conduits or lines such as the emergency and service lines, the relay valve, trailer and tractor pressure tanks and other parts of the system remain substantially the same in this form of the invention as in the previously described form, the application of identical reference numerals will suffice for their identification.

The valve casing 202 is in the form of a block having a longitudinally extending bore 208 formed centrally therein and in which bore the plunger 204 is reciprocable. The left hand end of the bore as viewed in Fig. 2 is closed by a plug 210 while the right hand end thereof is closed by an integral wall 212. The bore 204 includes an enlarged counterbore 214 within which there is disposed a piston 215 of a suitable elastomeric material, the piston being mounted on and movable with the plunger 204. The plunger 204 is normally maintained in a retracted position by means of a spring 216 which surrounds the plunger and is disposed within the counterbore 214 so as to bear at one end against the radial wall or shoulder 218 of the counterbore and at its other end against the piston 214. The counterbore 214 communicates with a transverse passage 220, the lower end of which is provided with a drain plug 222 and the upper end of which communicates through the line 98 with the port 100 associated with the control valve 206.

The casing or block 202 is formed with a pair of spaced transversely extending mores 226 and 228 respectively, both of which bores intersect the longitudinal bore 208. The upper end of the bore 226 communicates with the trailer emergency line 142 while the upper end of the bore 228 communicates with the service line 176. The bore 226 is formed with a counterbore 230 which communicates with the longitudinal bore 208 through a valve seat or port 232 adapted to be normally closed by a ball valve element 234 which is spring pressed as at 236 against the seat. The bore 228 similarly is formed with a counterbore 238 communicating with the longitudinal bore 208 through a valve seat or port 240 adapted to be closed by a ball valve element 242 which is spring pressed as at 244 against the seat. The plunger 204 is formed with a pair of longitudinally spaced annular clearance grooves 246 and 248 respectively in the medial regions thereof which, in the retracted position of the plunger, register with the ball valve elements 234 and 240 respectively and afford a clearance by the plunger for these elements so that the latter may become effectively seated under the influence of their respective springs 230 and 244. The plunger 204 is capable of being moved axially to the advanced position shown in dotted lines wherein the grooves 246 and 248 move out of register with the ball valve elements 234 and 242 and the latter ride onto the full diameter portions of the plunger stem so as to become unseated from their respective ports 232 and 240 simultaneously.

The transverse passage or bore 220 communicates through a longitudinally extending passage 250 with the transverse bore 226. The counterbore 230 communicates with the line 108 leading from the tractor pressure tank 14 and with the line 174 leading to the inlet side of the master control valve 21 while the counterbore 238 communicates with the line 172 leading to the outlet side of the master control valve 21.

Initial charging of the trailer tank 22 is effected as heretofore described in connection with the form of the invention shown in Fig. 1 by manually moving the control valve plunger 44 to its advanced position and thus causing air under pressure to flow through the line 36, ports 64, 58, passages 86, 84 and port 90 to the rear side of the piston to move the latter to its advanced position and lock the plunger in its advanced position wherein the ball valve 60 becomes unseated. Air will then flow from the pressure tank 14 through the line 36, ports 64, 58, passage 86, line 98, bore 220, passage 250, bore 226 and emergency line 142 for trailer pressure tank charging purposes as heretofore described. At such time as an internal pressure of approximately 45 pounds per square inch is built up in the system, the pressure within the bore 220 will exert a force on the piston 215 causing the spring 216 to yield and allow the plunger 204 to move to its advanced position. Such movement of the plunger 204 will cause both ball valve elements 234 and 244 to become unseated whereupon full pressure is available from the tractor pressure tank 14 to complete the trailer tank charging operations through the line 108, ports 122, 116, passage 160, port 138 and emergency line 142.

In view of the prior description of the system shown in Fig. 1 for manual or for emergency uncontrolled break away operations, slow leakage in the system and parking of the tractor-trailer assembly, it is deemed unnecessary to describe in detail the operation of the system shown in Fig. 2 to accomplish the same functions. It is believed sufficient to state that any procedure, whether voluntary on the part of the operator or involuntary which creates a loss of pressure within the system including the bores 220, 226 and 228, and the passage 250, will relieve the line 98 and passage 84 of pressure and cause retraction of the plunger 44, thus opening the port 68 and allowing the system to bleed to atmosphere through the exhaust port 82. Whether the opening of the port 68 is the result of manual movement of the plunger 44 to its retracted position or whether it is the result of automatic movement of the plunger under pneumatic influences, the result is the same and the consequent bleeding of the system will reduce the pressure in the bore 220 of the valve assembly 200 and cause the plunger 204 to become retracted under the influence of the spring 216, thus causing the ball valve elements 234 and 244 to become seated and seal off the lines 142 and 176.

In the form of the invention shown in Fig. 3, the same principle of operation of the system has again been preserved but, in this instance, the control, service and emergency valves have been incorporated in a single valve block or casing 300, the consolidation of these three valve units being accomplished in such a manner as to result in extreme simplicity with a minimum number of parts, particularly moving parts, and also resulting in the added advantage that the consolidated unit may be installed within the cab interior where, during operation, it is thermally protected against exposure to the elements.

The valve block 300 is operatively connected in the braking system previously described in connection with the other forms of the invention, the connections leading thereto and including the emergency and service lines, the relay valve, pressure tank, etc. have been given reference numerals identical with those previously used for the corresponding parts in the other illustrated forms of the system.

The block 300 is formed with a single longitudinally extending bore 302 which passes completely through the block and which has one end thereof closed by an end plate 304 secured in position by clamping bolts 306. The end plate 304 extends a short distance into the bore 302 and carries centrally thereof a resilient bumper pad 307 which may be formed of a suitable elastomeric material such as rubber or a rubber substitute. The block 300 is also formed with a pair of transversely extending, longitudinally spaced bores 308 and 310 which extend completely through the block and which intersect the longitudinal bore 302. A third transverse passage 312 extends into the block from the underneath side thereof and communicates with the longitudinal bore 302.

Slidably disposed within the bore 302 is a unitary one-piece plunger 314 which projects outwardly of the block at its left hand end as viewed in Fig. 3 and carries an operating knob 316 thereon. The plunger 314 projects through a guide sleeve 316 threadedly received in the left hand end of the bore 302 as at 318 and a clamping unit 320 is threadedly received on the sleeve for locking purposes. The plunger is sealed to the central bore 321 of the sleeve 316 by a suitable O-ring 322.

The bores 308 and 310 are formed with enlarged counterbores 324 and 326 respectively, providing internal valve seats 328 and 330 designed for cooperation with ball type valve elements 332 and 334, the ends of which are spring pressed against its seat as at 336. The stem portion of the plunger 314 is formed with clearance regions 338 and 340 respectively for the seated ball valve elements 332 and 334, these clearance regions having frusto-conical side walls 342 designed for camming engagement with the ball valve elements during shifting movement of the plunger. The plunger is movable from the retracted position wherein it is shown in full lines in Fig. 3 to the advanced position fragmentarily illustrated in dotted lines and wherein the extreme forward end of the plunger engages the resilient pad or bumper 307. In its retracted position, the ball valve elements 332 and 334 remain seated but upon movement of the plunger toward its advanced position the valve elements ride outwardly on the frusto-conical side walls 342 and become unseated to allow free flow of air through the respective bores 324 and 326. An O-ring seal is interposed between the plunger stem and inner cylindrical wall of the bore 302 to prevent short circuiting of air between the two transverse bores 324 and 326 through the bore 302.

The right hand end of the plunger 314 is formed with a relatively deep socket 350 therein, the inner end of which is in communication with a series of radial bores 352. The socket walls are formed with an annular groove 354 therearound in which there is disposed a suitable elastomeric O-ring 356 which in combination with the socket portion of the plunger 314 constitutes in effect a piston 358. The socket 350 and radial bores 352 serve to establish restricted communication between the portions of the bore 302 on opposite sides of the piston 358 for a purpose which will become clear presently. The plunger 314 is normally urged toward its retracted position by means of a spring 360 disposed between the end plate 304 and the piston 358.

The bores 308 and 310, together with their respective valve seats, valve elements and the operating portions of the plunger 314 associated therewith, comprise the service and emergency valve assemblies respectively, these assemblies being operative connected in the brake system as heretofore described in connection with the other forms of the invention.

In the operation of the valve construction shown in Fig. 3, initial charging of the trailer tank 22 is effected by manually moving the plunger 314 from its retracted position against the yielding action of the spring 360 to its advanced position whereupon the two valve elements 332 and 334 will ride outwardly onto the enlarged surface portions of the plunger stem and cause the valve elements to become unseated. This unseating of the valve elements 332 and 334 allows free passage of air through the bores 308 and 310 for trailer tank charging operation and for trailer brake operation.

Upon admission of air under pressure from the tractor pressure tank 14 to the bore 310, the plunger 314 is pneumatically held in its advanced position by the pressure air on the left hand side of the piston. Since the space within the bore 302 at the right hand side of the piston is in communication with the atmosphere through the passage 312, the piston is forced against the pad or bumper 307 and the forward open rim portion of the socket 350 is brought to bear against the pad 307 in sealing relationship with respect thereto. The exhaust of air to the atmosphere is thus terminated as soon as the plunger stem engages the pad 307.

When any contingency arises which results in a loss of pressure within the emergency line 142, whether it be the result of an emergency break away, a voluntary disconnecting of the trailer, or a slow leak in the system, the resultant decrease in pressure, in falling below the pressure for which the spring 360 is set, will allow the plunger 314 to be forced by the spring to its retracted position wherein the clearance regions 338 and 340 register with their respective ball valve elements 332 and 334, thus allowing these elements to become seated under the influence of the springs 334 and 336 and seal off both the emergency and service lines 142 and 176 respectively.

The invention is not to be limited to the exact arrangement of parts shown in the accompanying drawings or described in this specification as various changes in the details of construction may be resorted to without departing from the spirit of the invention. Only insofar as the invention has been particularly pointed out in the accompanying claims is the same to be limited.

Having thus described the invention what I claim as new and desire to secure by Letters Patent is:

1. An emergency and service line valve combination designed for use in the braking system of a tractor-trailer combination having an emergency line connected to the tractor pressure tank and the trailer pressure tank, a service line connected to the trailer brakes for operation of the latter, and a brake-operating device connected between the tractor pressure tank and the service line, said valve combination comprising two separate interconnected valves including an emergency valve adapted to be interposed in the emergency line between said tractor pressure tank and said trailer pressure tank, a service valve adapted to be interposed in the service line between the brake-operating device and the trailer brakes, said valves having similar valve casings, each in the form of a block having a straight bore extending longitudinally through the block and providing at one end an inlet port and at the other end an outlet port, normally closed valve means within the bore adjacent said inlet port for maintaining the same closed, pressure responsive means disposed within said straight bore between said valve means and outlet port and operable in response to a predetermined minimum degree of pressure at said outlet port for opening said normally closed valve means, said blocking having a transversely extending bore formed therein in communication with said longitudinally extending bore at a region between said pressure responsive means and said outlet port, said latter bore providing a second inlet port at one side of the casing and a second outlet port at the opposite side of the casing, there being a passage in said block establishing communication between said second outlet port and the longitudinally extending bore at a region between said pressure responsive means and said first inlet port, and a fluid line connecting said second outlet port and the second inlet port in the valve casing block for said service valve, the first inlet port of the emergency valve being adapted for connection to the tractor pressure tank, the first outlet port of the emergency valve being adapted for connection to the trailer pressure tank, the second inlet port of said emergency valve being adapted for selective connection to the tractor pressure tank under manual control, the first inlet port of the service valve being adapted for connection to said brake-operating device, and the outlet port of the service valve being adapted for connection to the trailer brakes.

2. An emergency and service line valve combination as set forth in claim 1 wherein the normally closed valve means in the longitudinal bores of each casing block comprises a valve seat within the bore, a valve element movable into and out of engagement with said seat, and a spring normally urging the valve element against said seat, and wherein said pressure responsive means of each valve casing comprises a plunger slidable within said bore and having one end thereof exposed to the pressure of fluid developed at said outlet ports and having its other end engageable with said valve element for unseating the same from said valve seat when a said predetermined degree of pressure is exceeded.

3. An emergency and service line valve combination as set forth in claim 1 wherein the normally closed valve means in the longitudinal bores of each casing block comprises a valve seat within the bore, a ball valve element movable into and out of engagement with said seat, and a spring normally urging the valve element against the seat, and wherein said pressure responsive means of each valve casing comprises a plunger having a piston formed thereon slidable within said bore between a retracted position wherein the plunger is out of engagement with said ball valve element to an advanced position wherein the plunger engages said ball valve element and moves the same from said seat, one side of the piston being exposed to the pressure of fluid at said outlet ports, and a spring normally urging said plunger toward its retracted position and capable of yielding when the pressure at said outlet ports exceeds said predetermined minimum.

4. An emergency and service line valve combination designed for use in the braking system of a tractor-trailer combination having an emergency line connected to the tractor pressure tank and to the trailer pressure tank, a service line connected to the trailer brakes for operation of the latter, and a brake-operating device connected between the tractor pressure tank and the service line, said valve combination comprising an emergency valve adapted to be interposed in the emergency line between said tractor pressure tank and said trailer pressure tank, a service valve interposed in the service line between the brake-operating device and the trailer brakes, said valves having identical valve casings each of which is in the form of a block having a straight bore extending longitudinally through the same and providing at one end an inlet port and at the other end an outlet port, normally closed valves means within the bore adjacent the inlet port for maintaining the latter closed, pressure responsive means disposed within said bore between said valve means and outlet port and operable in response to a predetermined minimum degree of pressure at said outlet port for opening said normally closed valve means, said block being formed with a transversely extending bore intersecting said longitudinally extending bore at a region between said pressure responsive means and said outlet port, said transversely extending bore passing completely through the block and establishing at one side of the block an inlet opening and at the other side an outlet opening, there being a passage in said block establishing communication between said inlet opening, said outlet opening and said inlet port, a fluid line connecting the outlet opening of the valve casing block associated with the emergency valve to the inlet opening of the valve casing block associated with the service valve, and a closure plug closing the outlet opening of said latter valve casing block, said inlet port of the emergency valve being adapted for connection to the tractor pressure tank, the outlet port thereof being adapted for connection to the trailer pressure tank, the inlet opening thereof being adapted for connection to the tractor pressure tank under manual control, the inlet port of the service valve being adapted for connection to said brake-operating device, and the outlet port thereof being adapted for connection to the trailer brakes.

5. An emergency and service line valve combination as set forth in claim 4 wherein the normally closed valve means in the longitudinally extending bores of each casing block comprises a valve seat within the bore, a ball valve element movable into and out of engagement with said seat, and a spring normally urging said ball valve element against said seat, and wherein said pressure responsive means of each valve casing comprises a reciprocable plunger having a piston thereon movable between retracted and advanced positions, there being an enlarged counterbore formed in said longitudinally extending bore and in which said piston is sealingly slidable, one end of the piston being exposed to the pressure of fluid in said bore at said outlet port and the other end of the piston being in the form of a reduced stem designed for engagement with said ball valve element when the plunger is in its advanced position, and spring means normally urging said plunger to its retracted position.

6. An emergency and service line valve combination as set forth in claim 4 wherein said passage is in the form of a longitudinally extending bore offset from said longitudinally extending straight bore and establishing a bypass around said pressure responsive means.

References Cited in the file of this patent
UNITED STATES PATENTS

| | | |
|---|---|---|
| 2,411,406 | Affleck | Nov. 19, 1946 |
| 2,645,239 | Horn et al. | July 14, 1953 |
| 2,645,308 | Fitch et al. | July 14, 1953 |
| 2,700,435 | Seale | Jan. 25, 1955 |
| 2,748,791 | Freeman | June 5, 1956 |
| 2,785,773 | Jeffrey et al. | Mar. 19, 1957 |